(12) United States Patent
Tanaka et al.

(10) Patent No.: US 7,719,638 B2
(45) Date of Patent: May 18, 2010

(54) SEMI-TRANSMISSIVE LIQUID CRYSTAL DISPLAY DEVICE WITH SIGNAL LINES THAT ARE BROADER IN THE TRANSMISSIVE PORTION THAN IN THE REFLECTIVE PORTION

(75) Inventors: Shinichiro Tanaka, Tottori (JP); Koji Yoshida, Tottori (JP)

(73) Assignee: Epson Imaging Devices Corp., Tokyo (JP)

( * ) Notice: Subject to any disclaimer, the term of this patent is extended or adjusted under 35 U.S.C. 154(b) by 382 days.

(21) Appl. No.: 11/449,721

(22) Filed: Jun. 9, 2006

(65) Prior Publication Data

US 2006/0290849 A1 Dec. 28, 2006

(30) Foreign Application Priority Data

Jun. 23, 2005 (JP) ............... 2005-182935

(51) Int. Cl.
*G02F 1/1335* (2006.01)
*G02F 1/1343* (2006.01)

(52) U.S. Cl. ..................... 349/114; 349/139

(58) Field of Classification Search .......... 349/114, 349/139, 145
See application file for complete search history.

(56) References Cited

U.S. PATENT DOCUMENTS

2004/0105058 A1* 6/2004 Lu ............................ 349/114

(Continued)

FOREIGN PATENT DOCUMENTS

EP 1 284 433 A2 2/2003

(Continued)

OTHER PUBLICATIONS

Office Action issued on Apr. 8, 2008 by Japanese Patent Office.

(Continued)

*Primary Examiner*—David Nelms
*Assistant Examiner*—Jessica M Merlin
(74) *Attorney, Agent, or Firm*—Westerman, Hattori, Daniels & Adrian, LLP

(57) ABSTRACT

A semi-transmissive liquid crystal display device 10 having a first substrate which is partitioned by signal lines 13 and scanning lines 12 provided in a matrix pattern in which a reflective part 15 and a transmissive part 16 are formed on respective positions, a second substrate which is formed with a color filter and a common electrode, and a liquid crystal layer which is provided in between said two substrates, wherein a pixel electrode 19 which is provided on said reflective part 15 and said transmissive part 16 is formed so as to overlap with said signal lines 13 and said scanning lines 12 via an insulating layer when viewed from the upper side, a width L1 of the signal line 13 corresponding to said transmissive part 16 is greater than a width L3 of said signal line 13 corresponding to said reflective part 15, and an overlapping width L2 of said pixel electrode 19 and said signal line 13 corresponding to said transmissive part 16 is greater than an overlapping width L4 of the pixel electrode 19 and said signal line 13 corresponding to said reflective part 15. As a result, it will be possible to provide a semi-transmissive liquid crystal display device having good contrast without any negative effects on display quality such as cross-talk or the like can be provided.

5 Claims, 7 Drawing Sheets

U.S. PATENT DOCUMENTS

2005/0270433 A1 * 12/2005 Ohue et al. ................... 349/38

FOREIGN PATENT DOCUMENTS

| JP | 11-101992 A | 4/1999 |
| JP | 2005-091819 A | 4/2005 |
| JP | 2005-106997 A | 4/2005 |
| JP | 2005-164789 | 6/2005 |
| JP | 2005164789 A * | 6/2005 |

OTHER PUBLICATIONS

European Search Report dated Oct. 16, 2006 for Application No. 06010497.3—2205.

* cited by examiner

Fig.2
Fig. 2A
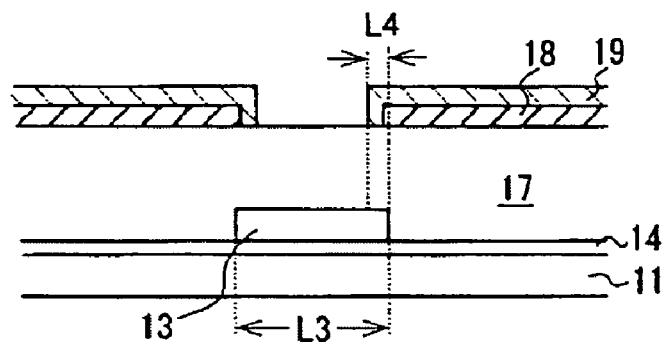
Fig. 2B
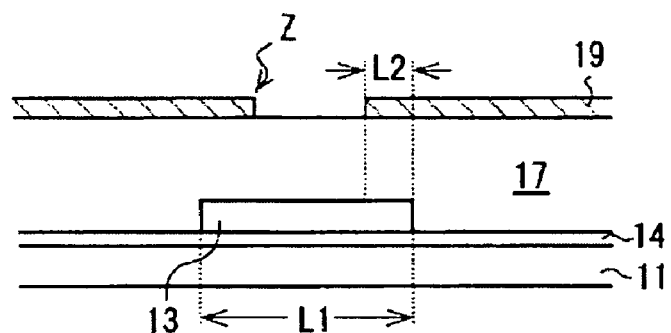
Fig. 2C
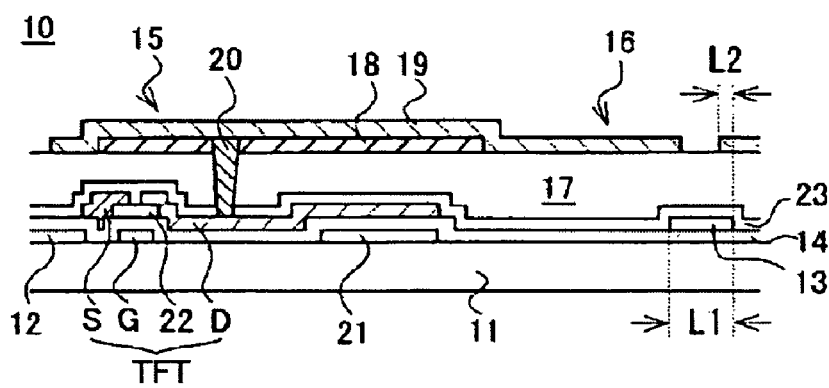

SEMI-TRANSMISSIVE LIQUID CRYSTAL DISPLAY DEVICE WITH SIGNAL LINES THAT ARE BROADER IN THE TRANSMISSIVE PORTION THAN IN THE REFLECTIVE PORTION

FIELD OF THE INVENTION

The present invention relates to a semi-transmissive liquid crystal display device, and in particular relates to a semi-transmissive liquid crystal display device having good contrast without any negative effects on display quality such as cross-talk or the like.

BACKGROUND OF THE INVENTION

In recent years the application of liquid crystal display devices has rapidly spread into not only information-communication devices, but general electrical equipment as well. Since liquid crystal display devices do not themselves emit light, transmissive-type liquid crystal display devices provided with a backlight are commonly employed. However, because the backlight consumes a large amount of power, particularly for portable devices reflective-type liquid crystal display devices which do not require a backlight are being used to reduce power consumption. Nonetheless, since reflective liquid crystal display devices utilize external light as a light source, it is difficult to view these devices in a dark room or similar environment. In view of this, in recent years development has been progressing into semi-transmissive-type liquid crystal display devices which especially combine transmissive-type and reflective-type qualities (disclosed in Japanese Patent Laid-Open No. 11-101992 and Japanese Patent Laid-Open No. 2005-106997).

Such a semi-transmissive liquid crystal display device comprises, in a single pixel region, a transmissive part comprising a pixel electrode, and a reflective part comprising both a pixel electrode and a reflective electrode. In dark places, the backlight is lit up and the pixel region transmissive part is utilized to display an image, while in bright places, external light is utilized at the reflective part to display an image without the backlight being lit up. This means that the backlight does not have to be lit at all times, which has the advantage that power consumption can be dramatically reduced.

One example of such a semi-transmissive liquid crystal display device will be explained with reference to FIGS. 3 and 4. FIG. 3 is a plan view of one pixel displayed when viewed through the color filter substrate of a conventional semi-transmissive liquid crystal display device. FIG. 4A is a cross-sectional view along the line IVA-IVA of FIG. 3, and FIG. 4B is a cross-sectional view along the line IVB-IVB of FIG. 3.

This semi-transmissive liquid crystal display device 10A is formed, directly through a plurality of scanning lines 12 and signal lines 13 or via an inorganic insulating film 14, into a matrix pattern on a transparent insulating glass substrate 11. Here, the region enclosed by the scanning lines 12 and signal lines 13 corresponds to one pixel, wherein a TFT (Thin Film Transistor) (not shown) acting as a switching device is formed for each pixel.

Further, an interlayer film 17 made of an organic insulating film is laminated so as to cover the scanning lines 12, signal lines 13 and inorganic insulating film 14, wherein tiny uneven portions are formed on the surface at the reflective part 15 and wherein the surface at the transmissive part 16 is made flat. It is noted that in FIGS. 3 and 4 the uneven portions of the reflective part 15 have been omitted. The interlayer film 17 is provided with a contact hole 20 at a location corresponding to the drain electrode of the TFT. For each pixel, a reflective electrode 18 made of aluminum metal, for example, on its reflective part 15 is formed on the contact hole 20 and the surface of the interlayer film 17, and a transparent pixel electrode 19 made of ITO (Indium Tin Oxide), for example, is formed on the surface of this reflective electrode 18 and the surface of the interlayer film 17 of the transmissive part 16.

In this semi-transmissive liquid crystal display device 10A, the widths of the scanning lines 12 and signal lines 13 are all designed to be formed identically, so that the width L1 of the signal lines 13 in the transmissive part 16 is the same as the width L3 of the signal lines in the reflective part 15. In addition, at the transmissive part 16, the pixel electrode 19 is formed so as not to be in contact with the pixel electrode or the reflective electrode of the pixels adjacent thereto, and, so as to slightly overlap with a scanning line 12 and signal line 13. Among these, the pixel electrode 19 and a signal line 13 are formed so that the width L2 only is overlapping in order to prevent light leakage. Moreover, at the reflective part 15, the reflective electrode 18 and the pixel electrode 19 are formed so as not to be in contact with the reflective electrode or the pixel electrode of the pixels adjacent thereto, and, so as to slightly overlap with a scanning line 12 and signal line 13 to similarly prevent light leakage. Among these, the overlapping width L4 between the pixel electrode 19 and a signal line 13 is formed to be essentially the same as that of said L2.

In addition, a backlight device is provided at a lower portion of the glass substrate 11 comprising (not shown) a well-known light source, light guide plate, diffusion sheet and the like. Further, an oriented film (not shown) is laminated on the surface of the pixel electrode 19 so as to cover all the pixels. A color filter substrate (not shown) provided with elements such as an R, G, B three-color color filter formed to correspond to each pixel and opposing electrodes, faces this glass substrate 11. A sealant is provided surrounding both the substrates, whereby the two substrates are stuck together. The semi-transmissive liquid crystal display device 10A is formed by injecting liquid crystal in between the two substrates.

Thus, in the conventional semi-transmissive liquid crystal display device 10A, by forming so that the reflective electrode 18 and pixel electrode 19 slightly overlap a scanning line 12 and signal line 13, the light leakage from this portion can be prevented, thereby achieving an improvement in contrast.

However, as illustrated in FIGS. 4a and 4b, if a pixel electrode is formed on the scanning line and signal line, a given capacitance Csd is present between the scanning line 12 and signal line 13 and the pixel electrode 19 formed on the reflective electrode 18. If this capacitance Csd equals or goes above a certain value, flicker and cross-talk will occur when activating the liquid crystal display device. Moreover, the mechanisms respectively causing flicker and cross-talk are different. Namely, because the pixel electrodes are activated in an alternating manner with respect to their opposing electrode, the polarity of the voltage applied to the pixel electrode alternately switches with respect to the opposing electrode voltage according to a given cycle (e.g. 60 Hz). However, flicker occurs when the pixel electrode voltage changes, occurring at the side further away from the drive terminal of the scanning line, and not at the side closer to the drive terminal.

In contrast, particularly when black is displayed on a white background screen, cross-talk occurs in the vicinity of the black being displayed. The mechanism for such cross-talk occurrence is thought to be caused as a result of the following. That is, FIG. 5 illustrates a screen on which cross-talk has occurred at the semi-transmissive liquid crystal display device 10A illustrated in FIGS. 3 and 4, for example. When a black screen is displayed on a white background as illustrated in FIG. 5, if the white background region is represented by point X and above and below the black screen, i.e. the region on the signal line side, is represented by point Y, the voltage waveform at the respective points X, Y are as illustrated in FIG. 6.

FIG. 6 illustrates that if a signal is applied to the gate electrode of a TFT, the TFT is activated to initiate writing on the pixel electrode. The potential of the pixel electrode at this point is maintained for a prescribed period of time by an auxiliary electrode capacitance (refer to FIG. 6A). The potential used for white display which is write onto the pixel electrode in this period fluctuates during the retention period in accordance with the amplitude of the opposing electrode potential Vcom (refer to FIG. 6B). In this state, if the voltage waveform that is being applied to the signal line and pixel electrode at points X and Y is observed, at the signal line of the point X portion, a white display voltage is being constantly applied until the next write period arrives, so that the potential of the pixel electrode of this point X portion fluctuates by the same amplitude until the next write period arrives (refer to FIGS. 6C and 6D).

On the other hand, if en route the voltage used for black display is applied to the signal line of the point Y portion, the amplitude of the pixel electrode potential of this point Y portion varies during the period that the voltage used for black display is being applied to the signal line (refer to FIG. 6E). As a result, the actual value of the voltage applied to the liquid crystals differs between points X and Y, whereby a delta ΔV is generated. This delta is manifested as a difference in brightness, thus becoming a cause of cross-talk occurrence (refer to FIG. 6F).

This delta ΔV which is a cause of cross-talk can be expressed by the below equation 1 in accordance with a single pixel equivalent circuit of the liquid crystal display device illustrated in FIG. 7.

$$\Delta V = Csd \times Vcom \div (Clc + Cst + Csd) \quad (1)$$

wherein,
Cst: auxiliary electrode capacitance
Csd: capacitance between source/drain
Clc: liquid crystal capacitance Therefore, it can be seen from this equation 1 that the smaller the capacitance Csd between source/drain is, the smaller the delta ΔV becomes.

Thus, lowering the capacitance Csd between source/drain, i.e. making the overlap between a signal line and the pixel electrode smaller, results in a smaller delta ΔV, whereby cross-talk can be reduced.

However, the major cause of light leakage lies in the disarray of the orientation of the liquid crystals at the end of the pixel electrode. Thus, if the overlap between the signal line and the pixel electrode is made smaller in order to reduce cross-talk, the problem arises that light leakage increases, especially at the transmissive part, thereby causing contrast to decrease.

SUMMARY OF THE INVENTION

The present invention was created in order to overcome such problems of the conventional art, wherein it is particularly an object thereof to provide a semi-transmissive liquid crystal display device having good contrast without any negative effects on display quality such as cross-talk or the like.

The above-described object of the present invention is achieved by the following configuration. That is, a semi-transmissive liquid crystal display device according to one embodiment of the present invention comprises a first substrate which is partitioned by signal lines and scanning lines provided in a matrix pattern in which a reflective part and a transmissive part are formed on respective positions, a second substrate which is formed with a color filter and a common electrode, and a liquid crystal layer which is provided in between said two substrates, wherein a pixel electrode which is provided on said reflective part and said transmissive part is formed so as to overlap with said scanning lines and said signal lines via an interlayer film when viewed from the upper side, a width of the signal lines in said transmissive part is broader than a width of the signal lines corresponding to said reflective part, and an overlapping width of the pixel electrode and a signal line in said transmissive part is broader than an overlapping width of the pixel electrode and a signal line in said reflective part.

It is preferred that said interlayer film is integratedly provided on said reflective part, said transmissive part, said signal lines and said scanning lines.

It is preferred that the overlapping width of the pixel electrode and a signal line in said transmissive part to be 1.0 μm or more greater than the overlapping width of the pixel electrode and a signal line in said reflective part.

It is preferred to be defined that the overlapping width of the pixel electrode and a signal line in said transmissive part to be 1.2 μm or more.

It is preferred to be formed that the reflective electrode of said reflective part so as to overlap with said scanning line and said signal line via said interlayer film when viewed from the upper side.

The present invention provides the following superior effects as a result of comprising the above-described configurations. That is, according to one embodiment of the present invention, since the overlapping width of said pixel electrode and said signal line in the transmissive portion is broader than the overlapping width of the signal line corresponding to the reflective portion, contrast is good due to the light leakage from the overlapping portion of the pixel electrode and the signal line being reduced, although the capacitance between the pixel electrode and the signal line in the transmissive portion is greater than the capacitance between the pixel electrode and the signal line in the reflective portion. Furthermore, according to the invention of claim 1, because the increased amount of capacitance between the pixel electrode and the signal line generated as a result of the contrast increase is limited to the just the part in the vicinity of the pixel electrode, there is little follow-on effect on cross-talk increase, whereby a semi-transmissive liquid crystal display device can be attained which provides for an increase in contrast while at the same time maintaining display quality.

Moreover, by providing the interlayer film integrally on the reflective part, the transmissive part, the signal lines and the scanning lines, since an interlayer film is provided essentially over the entire image display region of the liquid crystal display device, the pixel electrode in at least the transmissive part can be made flat, whereby the disarray in orientation of the liquid crystal molecules in the transmissive part can be reduced, which reduces light leakage, thereby improving contrast.

By forming the overlapping width of the pixel electrode and the signal line in the transmissive portion to be 1.0 μm or more greater than the overlapping width of the pixel electrode and the signal line corresponding to the reflective portion, light leakage in this part can be effectively reduced, thereby allowing a semi-transmissive liquid crystal display device to be attained which can provide more remarkable effects than those of the invention according to claim 1.

By selecting the overlapping width of the pixel electrode and a signal line in the transmissive part to be as 1.2 μm or more, a semi-transmissive liquid crystal display device can be attained which can provide the above effects even if there are deviations in production, such as mask positioning errors or the like.

By forming the reflective electrode of the reflective part so as to overlap with the scanning line and the signal line via the interlayer film when viewed from the upper side, contrast is improved, because the light leakage at the reflective part can be reduced by the reflective electrode.

BRIEF DESCRIPTION OF THE DRAWINGS

FIG. 2A is a cross-sectional view along the line IIA-IIA of FIG. 1, FIG. 2B is a cross-sectional view along the line IIB-IIB of FIG. 1, and FIG. 2C is a cross-sectional view along the line IIC-IIC of FIG. 1.

DETAILED DESCRIPTION OF THE PREFERRED EMBODIMENTS

Figure 1:
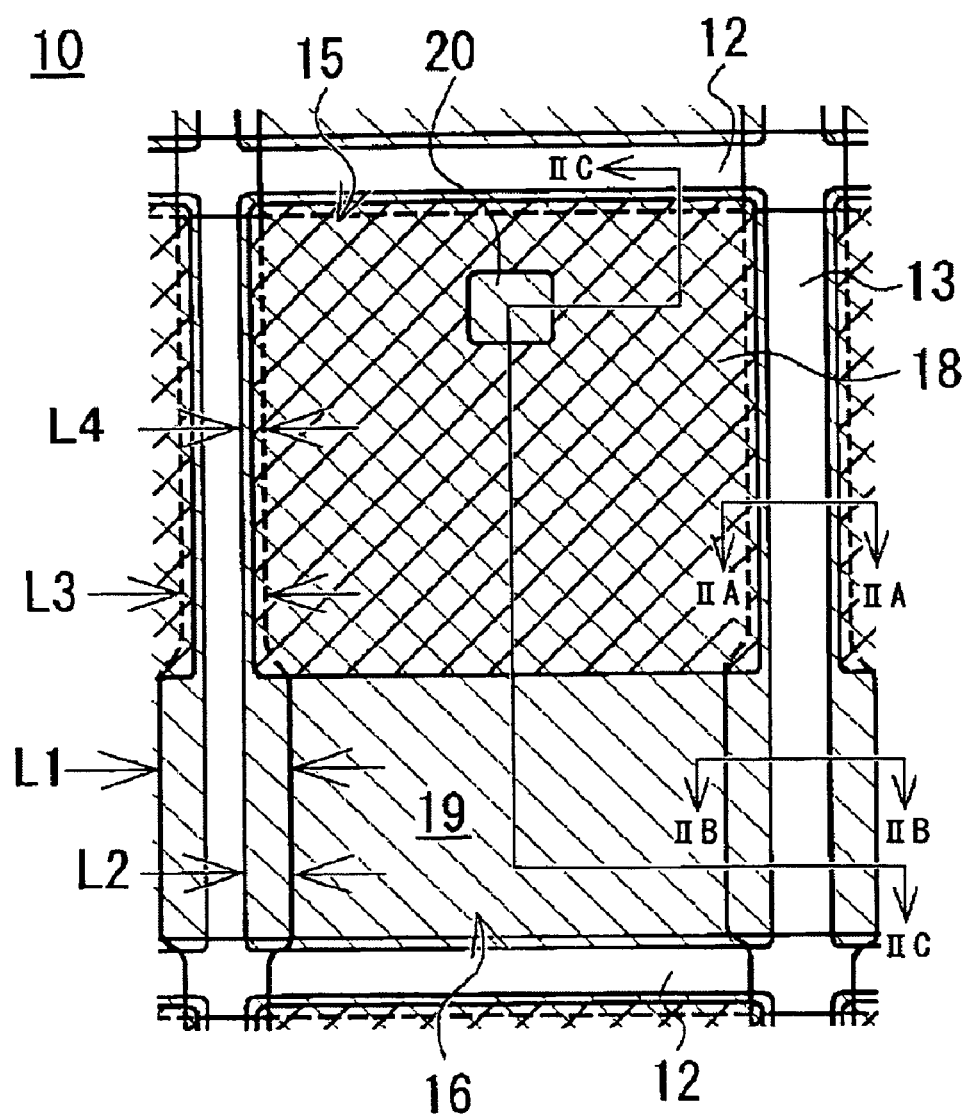
FIG. 1 is a plan view of one pixel displayed when viewed through the color filter substrate of a semi-transmissive liquid crystal display device according to the Examples.
Figure 3:
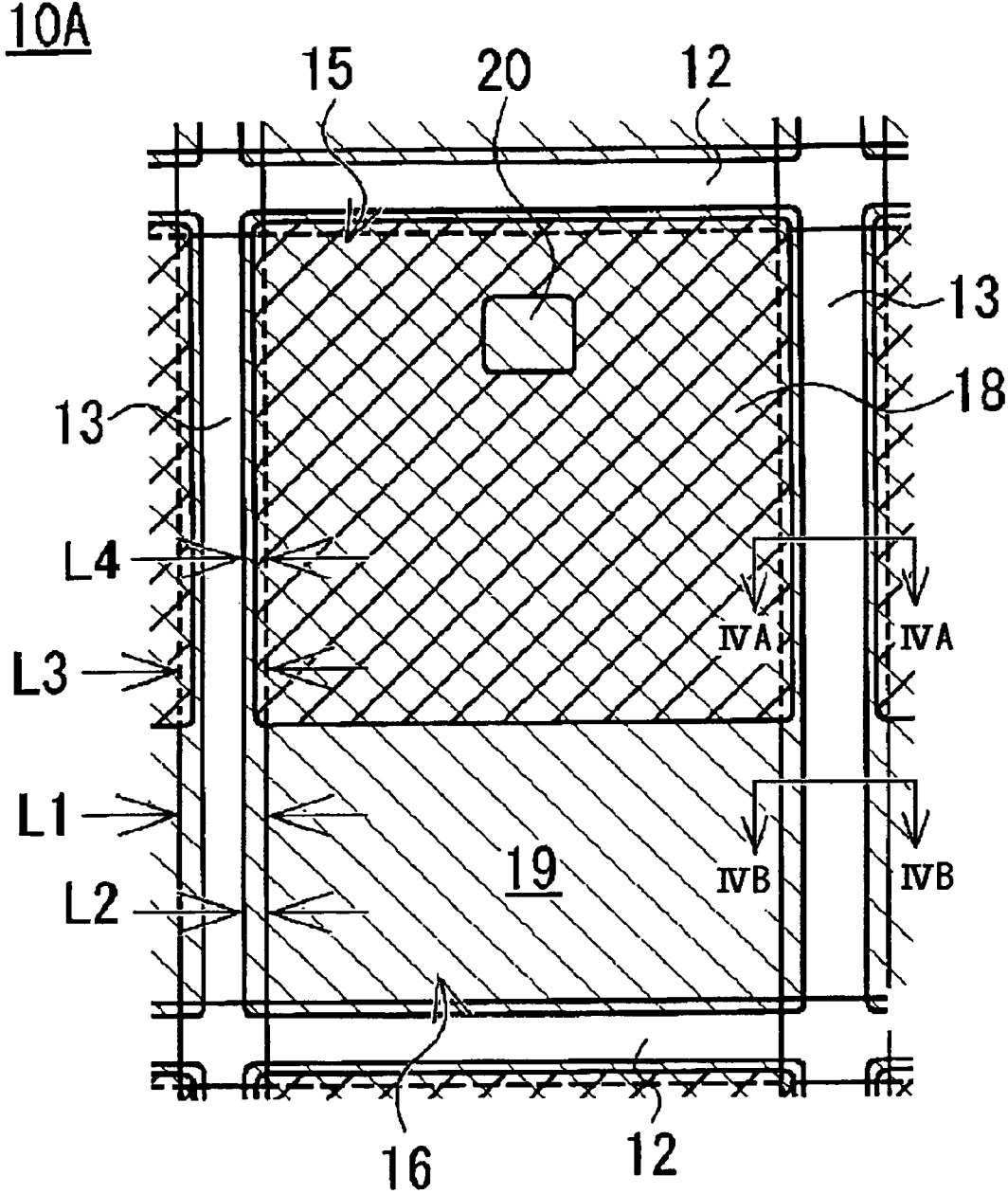
FIG. 3 is a plan view of one pixel displayed when viewed through the color filter substrate of a conventional semi-transmissive liquid crystal display device.
Figure 4A:
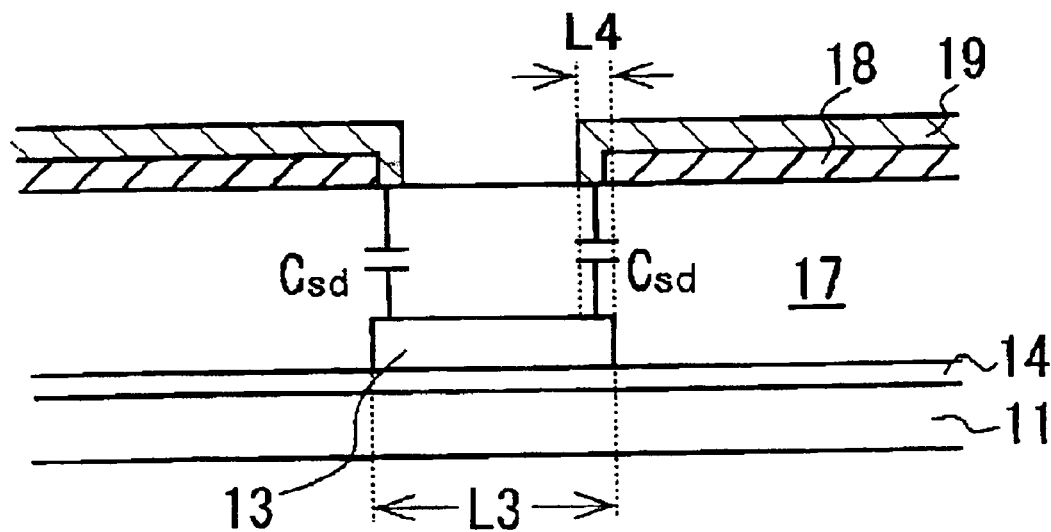
FIG. 4A is a cross-sectional view along the line IVA-IVA of FIG. 3
Figure 4B:
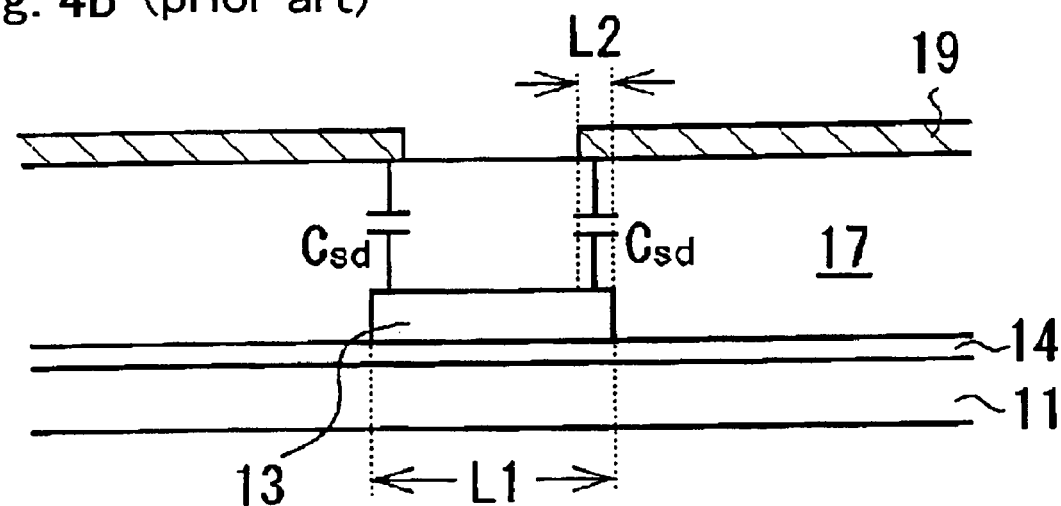
FIG. 4B is a cross-sectional view along the line IVB-IVB of FIG. 3.
Figure 5:
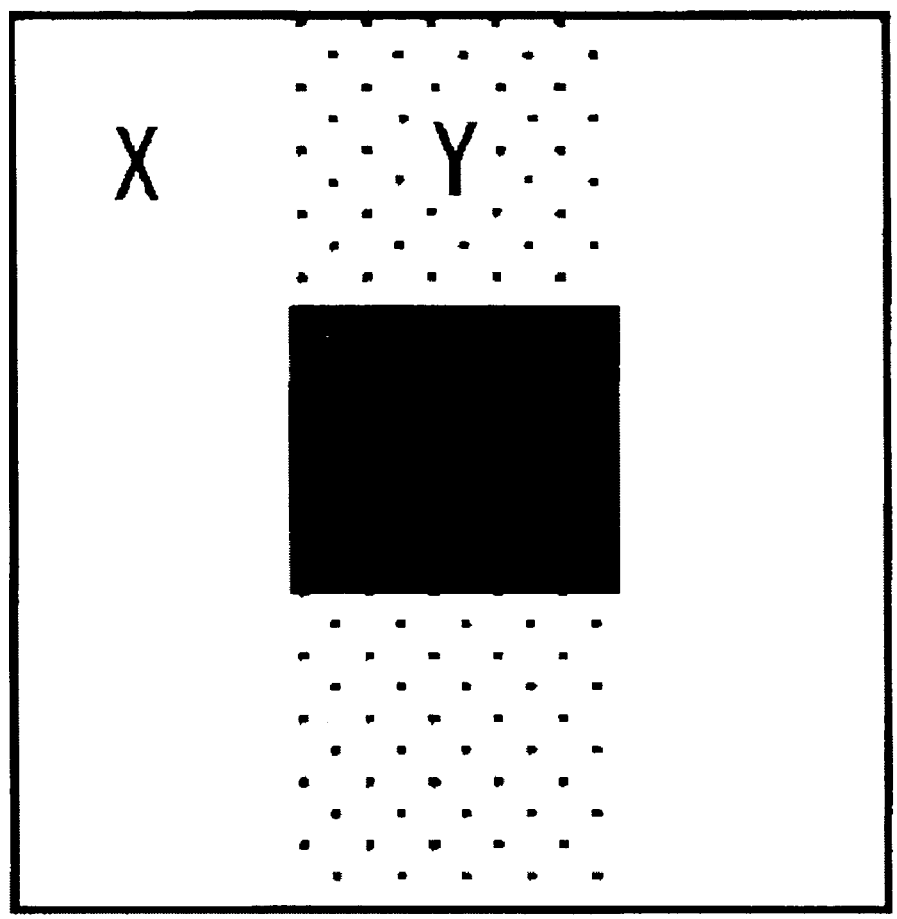
FIG. 5 is a graph illustrating a screen in which cross-talk has occurred.
Figure 6:
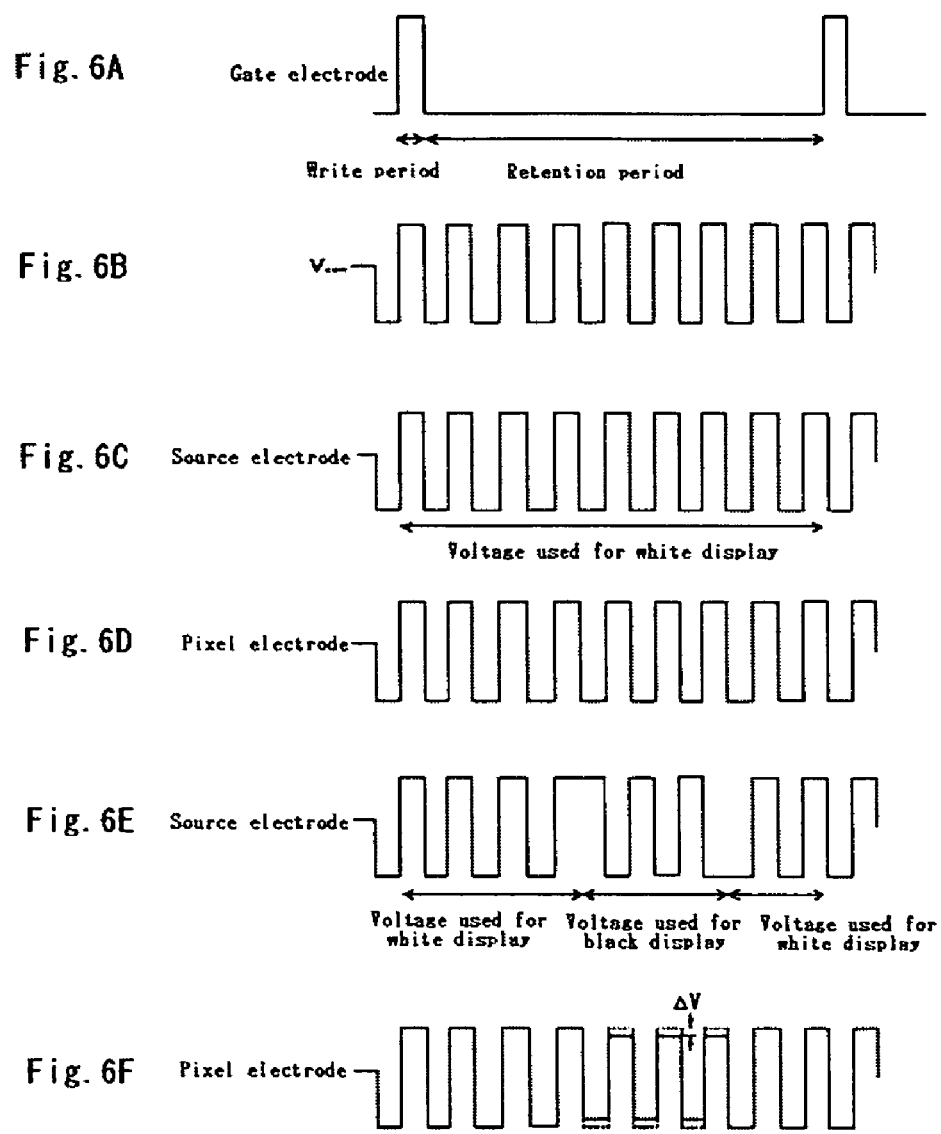
FIG. 6 is a series of diagrams illustrating voltage waveform at each point of a liquid crystal display device when cross-talk is occurring.
Figure 7:
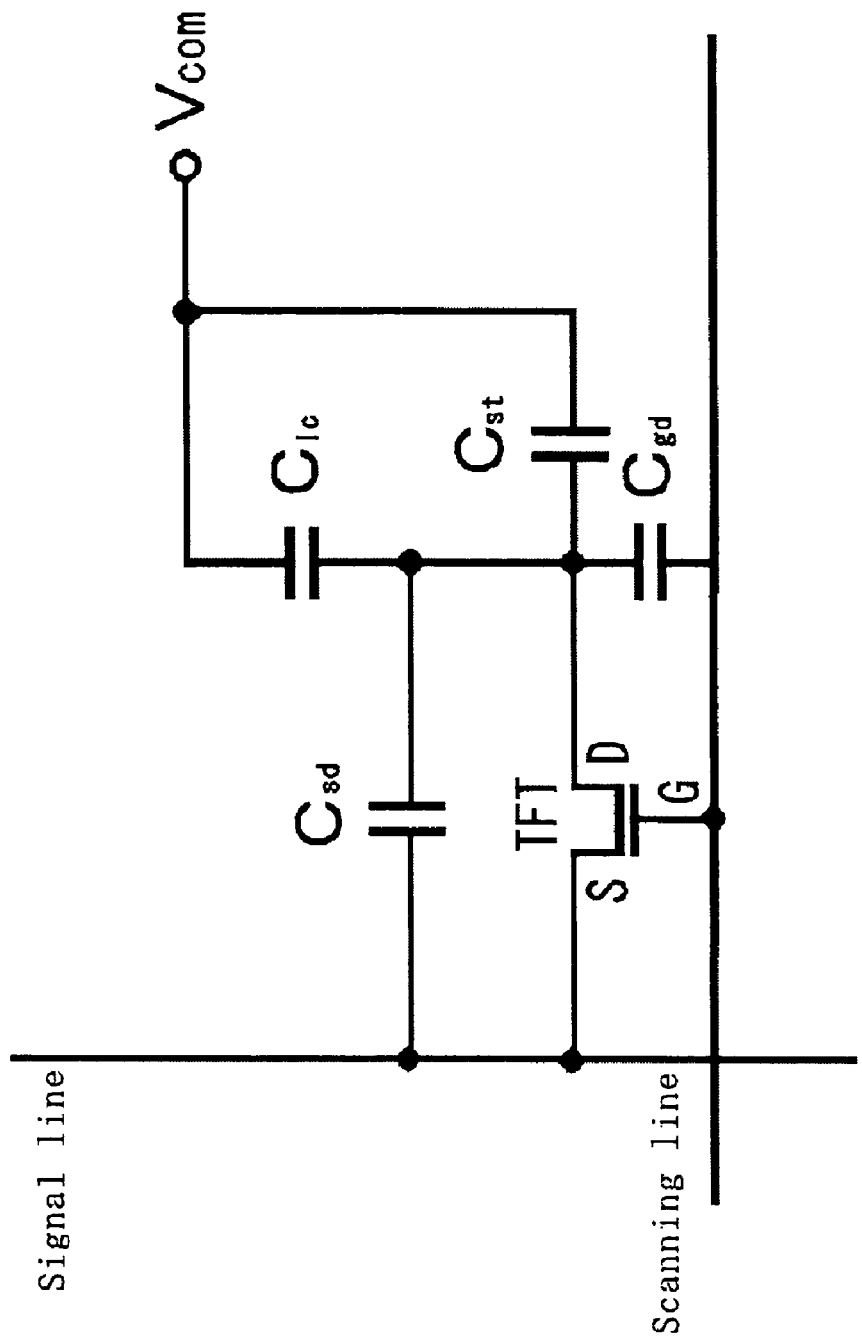
FIG. 7 is a single pixel equivalent circuit of a liquid crystal display device.

Below, examples according to the present invention will now be explained with reference to FIGS. 1 and 2. Although embodiments of a semi-transmissive type liquid crystal display panel are illustrated in order to describe the technical ideas behind the present invention in more detail, these embodiments are in no way intended to limit the present invention to what is disclosed herein. FIG. 1 is a plan view of one pixel displayed when viewed through the color filter substrate of a semi-transmissive liquid crystal display device according to the Examples. FIG. 2A is a cross-sectional view along the line IIA-IIA of FIG. 1, FIG. 2B is a cross-sectional view along the line IIB-IIB of FIG. 1, and FIG. 2C is a cross-sectional view along the line IIC-IIC of FIG. 1. Explanation will be carried out by providing the same reference numerals to the elements that are the same as in the conventional semi-transmissive liquid crystal display device illustrated in FIGS. 3 and 4.

This semi-transmissive liquid crystal display device 10 is formed with a plurality of equally spaced and parallel scanning lines 12, which is made of a metal such as aluminum, molybdenum or the like, on a transparent, insulating glass substrate 11. In approximately the middle of adjacent scanning lines 12, a scanning line 12 and an auxiliary capacitance line 21 are formed in parallel. In addition, the gate electrode G of the TFT protrudes from the scanning lines 12.

A gate insulating film 14, made of silicon nitride, silicon oxide or the like, is laminated on the glass substrate 11 so as to cover the scanning lines 12, auxiliary capacitance line 21 and gate electrode G. A semiconductor layer 22, made of amorphous silicon, polycrystalline silicon or the like, is formed on the gate electrode G via the gate insulating film 14. A plurality of signal lines 13, made of a metal such as aluminum, molybdenum or the like, are formed on the gate insulating film 14 in an orthogonal manner to the scanning lines 12. A source electrode S of the TFT protrudes from these signal lines 13. This source electrode S is in contact with the semiconductor layer 22. In addition, a drain electrode D, which is made of the same material and was formed at the same time as the signal lines 13 and the source electrode S, is provided on the gate insulating film 14. This drain electrode D is also in contact with the semiconductor layer 22.

Here, the region enclosed by the scanning lines 12 and signal lines 13 corresponds to one pixel. A TFT acting as a switching element is constituted from the gate electrode G, gate insulating film 14, semiconductor layer 22, source electrode S and drain electrode D, and such a TFT is formed on each pixel. In this case, the auxiliary capacitance of each pixel is formed from the drain electrode D and the auxiliary capacitance line 21.

A protective insulating film 23 made of an inorganic insulating material, for example, is laminated so as to cover the signal lines 13, the TFT and the gate insulating film 14. An interlayer film 17, which is made of an organic insulating film, has tiny uneven portions formed on the surface of the reflective part 15, and has the surface of the transmissive part 16 made flat, is formed on this protective insulating film 23. It is noted that the uneven portions formed on the reflective part 15 of the interlayer film 17 are omitted in FIGS. 1 and 2. Further, a contact hole 20 is formed on the protective insulating film 23 and the interlayer film 17 at a location corresponding to the drain electrode D of the TFT.

For each pixel, a reflective electrode 18 made of aluminum metal, for example, on its reflective part 15 is provided on the contact hole 20 and a part of the surface of the interlayer film 17. A transparent pixel electrode 19 made of ITO, for example, is formed on the surface of this reflective electrode 18 and the surface of the interlayer film 17 of the transmissive part 16.

In the semi-transmissive liquid crystal display device 10 according to the present example, the width L1 of the signal line 13 in the transmissive part 16 is greater than the width L3 of the signal line in the reflective part 15, whereby L1>L3. In addition, at the transmissive part 16, the pixel electrode 19 is formed so as not to be in contact with the pixel electrode or the reflective electrode of the pixels adjacent thereto, and, so as to slightly overlap when viewed from the side with a scanning line 12 and a signal line 13 via an interlayer film 17. Moreover, at the reflective part 15 as well, the reflective electrode 18 and the pixel electrode 19 are formed so as not to be in contact with the reflective electrode or the pixel electrode of the pixels adjacent thereto, and, so as to slightly overlap when viewed from the side with a scanning line 12 and a signal line 13 via an interlayer film 17. Among these, the width L2 of the overlapping portion of the pixel electrode 19 and a signal line 13 at the transmissive part 16 is greater than the overlapping width L4 between the pixel electrode 19 and a signal line 13 at the reflective part 15, whereby L2>L4.

The reason why the overlapping width L2 of a signal line 13 and the pixel electrode 19 at the transmissive part 16 is greater than the overlapping width L4 of a signal line 13 and the pixel electrode 19 at the reflective part 15 is as follows. Namely, the light leakage in the vicinity of the boundary area of the signal line 13 and the pixel electrode 19 is due to the disarray in the orientation of the liquid crystal molecules at the end of the pixel electrode 19. That is, in the vicinity of an end of a pixel electrode 19, that is Z (refer to FIG. 2B), disarray in the orientation of liquid crystal molecules is generated due to the presence of a region among the pixel electrodes wherein voltage is not controlled. If a black display voltage is applied to the pixel electrode 19, light from the backlight which normally does not pass through the liquid crystal display device 10 leaks as a result of the disarray in orientation of the liquid crystal molecules. However, since at the reflective part 15 the reflective electrode 18 also partially overlaps the signal line 13 via the interlayer film 17, and since this reflective electrode 18 is made of aluminum or other such metal, light is completely blocked, whereby there is little light leakage at the reflective part 15 as a result of disarray in the orientation of the liquid crystal molecules in the end vicinity of the pixel electrode 19.

Thus, in the liquid crystal display device 10 according to the present example, the overlapping width L2 of a signal line 13 and the pixel electrode 19 at the transmissive part 16 is greater than the overlapping width L4 of the signal line 13 and the pixel electrode 19 at the reflective part 15, whereby L2>L4. In such a case, it is necessary for the difference between L2 and L4 to be 1 μm or more in order to clearly ascertain the light-blocking effects.

In the present example, since in consideration of deviations in production, such as mask positioning errors or the like, the difference between L2 and L4 is set to be 1 μm or more and the L4 value at the reflective part 15 is set so as to secure a minimum level of 0.2 μm, i.e. the overlap L2 between a signal line 13 and the pixel electrode 19 at the transmissive part 16 is set so as to ensure 1.2 μm or more, as the specific dimensions in terms of the design for L1 to L4, L1=10 μm, L2=3 μm, L3=8 μm, and L4=2 μm were employed.

In addition, at a lower portion of the glass substrate 11, a backlight device is provided comprising (not shown) a well-known light source, light guide plate, diffusion sheet and the like. Further, an oriented film (not shown) is laminated on the surface of the pixel electrode 19 so as to cover all the pixels. A color filter substrate (not shown) provided with elements such as a R, G, B three-color color filter formed to correspond to each pixel and opposing electrodes, faces this glass substrate 11. A sealant is provided surrounding both the substrates, whereby the two substrates are stuck together. The semi-transmissive liquid crystal display device 10 is formed by injecting liquid crystal in between the two substrates.

Thus, in the semi-transmissive liquid crystal display device 10 according to the present example, the width L1 of the signal line 13 in the transmissive part 16 is greater than the width L3 of the signal line in the reflective part 15, whereby L1>L3. In addition, by making the width L2 of the overlapping portion of the pixel electrode 19 and a signal line 13 at the transmissive part 16 to be greater than the overlapping width L4 between the pixel electrode 19 and a signal line 13 at the reflective part 15, light leakage from the boundary area of the signal line 13 and the pixel electrode 19 at the transmissive part 16 can be sufficiently prevented, whereby a rise in contrast can be achieved. Furthermore, at the reflective part 15 which can achieve sufficient light leakage prevention from the reflective electrode 18, because cross-talk can be suppressed by making the overlapping width L4 between the pixel electrode 19 and a signal line 13 smaller than the width L2 of the overlapping portion of the pixel electrode 19 and a signal line 13 at the transmissive part 16 thereby to reduce the passive capacitance Csd generated between the signal line 13 and the pixel electrode 19, a semi-transmissive liquid crystal display device 10 can be attained in which contrast is particularly good while having no negative effects on display quality such as cross-talk or the like.

The invention claimed is:

1. A semi-transmissive liquid crystal display device, comprising:
    a first substrate which is partitioned by signal lines and scanning lines provided in a matrix pattern in which a pixel is formed on respective positions, said pixel comprising a reflective part and a transmissive part, a reflective pixel electrode being provided in said reflective part, and a transmissive pixel electrode being provided in said transmissive part,
    a second substrate which is formed with a color filter and a common electrode, and a liquid crystal layer which is provided in between said two substrates,
    the reflective pixel electrode which is provided on said reflective part and said transmissive part being formed so as to overlap with said scanning lines and said signal lines via an interlayer film when viewed from the upper side,
    wherein an entire width of the signal lines in said transmissive part is broader than a width of the signal lines corresponding to said reflective part,
    wherein an overlapping width of the transmissive pixel electrode and a signal line in said transmissive part is formed,
    wherein an overlapping width of the reflective pixel electrode and said signal line in said reflective part is formed, and
    wherein said overlapping width of the signal line and the transmissive pixel electrode is larger than said overlapping width of the signal line and the reflective pixel electrode.

2. The semi-transmissive liquid crystal display device according to claim 1, wherein said interlayer film is provided on said reflective part, said transmissive part, said signal lines and said scanning lines.

3. The semi-transmissive liquid crystal display device according to claim 1, wherein the overlapping width of the pixel electrode and a signal line in said transmissive part is 1.0 μm or more greater than the overlapping width of the pixel electrode and a signal line in said reflective part.

4. The semi-transmissive liquid crystal display device according to claim 1, wherein the overlapping width of the pixel electrode and a signal line in said transmissive part is 1.2 μm or more.

5. The semi-transmissive liquid crystal display device according to claim 1, wherein the pixel electrode provided on said reflective part is also is formed so as to overlap with said scanning lines and said signal lines via said interlayer film when viewed from the upper side.

* * * * *

UNITED STATES PATENT AND TRADEMARK OFFICE
CERTIFICATE OF CORRECTION

PATENT NO. : 7,719,638 B2
APPLICATION NO. : 11/449721
DATED : May 18, 2010
INVENTOR(S) : Shinichiro Tanaka et al.

It is certified that error appears in the above-identified patent and that said Letters Patent is hereby corrected as shown below:

Title Page, in Item 73:
Change
"(73) Assignee: Epson Imaging Devices Corp., Tokyo (JP)"

To be

--(73) Assignee: Epson Imaging Devices Corp., Azumino-shi, Nagano, Japan--

Signed and Sealed this

Fifth Day of October, 2010

David J. Kappos
*Director of the United States Patent and Trademark Office*